United States Patent
Hamamoto

(10) Patent No.: US 10,450,974 B2
(45) Date of Patent: Oct. 22, 2019

(54) CONTROL DEVICE FOR INTERNAL COMBUSTION ENGINE AND CONTROL METHOD FOR INTERNAL COMBUSTION ENGINE

(71) Applicant: NISSAN MOTOR CO., LTD., Yokohama-shi, Kanagawa (JP)

(72) Inventor: Takayuki Hamamoto, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/759,913

(22) PCT Filed: Sep. 18, 2015

(86) PCT No.: PCT/JP2015/076697
§ 371 (c)(1),
(2) Date: Mar. 14, 2018

(87) PCT Pub. No.: WO2017/046947
PCT Pub. Date: Mar. 23, 2017

(65) Prior Publication Data
US 2018/0258871 A1 Sep. 13, 2018

(51) Int. Cl.
*F02D 41/00* (2006.01)
*F02D 9/02* (2006.01)
*F02D 41/18* (2006.01)

(52) U.S. Cl.
CPC ........... *F02D 41/0065* (2013.01); *F02D 9/02* (2013.01); *F02D 41/005* (2013.01);
(Continued)

(58) Field of Classification Search
CPC .............. F02D 41/0065; F02D 41/005; F02D 41/0077; F02D 41/18; F02D 9/02; F02D 2041/0017
(Continued)

(56) References Cited

U.S. PATENT DOCUMENTS

2009/0194079 A1* 8/2009 Nagae ................... F01N 3/0235
123/568.11
2009/0223221 A1* 9/2009 Onishi ................ F02D 41/0065
60/603

(Continued)

FOREIGN PATENT DOCUMENTS

EP  2 128 407 A1  12/2009
EP  3 348 818 A1  7/2018
(Continued)

OTHER PUBLICATIONS

USPTO Office Action, U.S. Appl. No. 15/760,389 including (US 2001/0011541, US 2001/0042529, US 2005/0092292, US 2008/0264045, US 2017/0015326, US 2017/0356361), dated Jun. 14, 2019.

*Primary Examiner* — Mahmoud Gimie
(74) *Attorney, Agent, or Firm* — Foley & Lardner LLP

(57) ABSTRACT

An internal combustion engine includes an intake passage of the internal combustion engine, an exhaust passage of the internal combustion engine, an EGR passage connecting the intake passage and the exhaust passage. The internal combustion engine further includes a throttle valve provided downstream of a connected part to the EGR passage in the intake passage, and configured to control a quantity of intake air flowing into the internal combustion engine, and an intake throttle valve provided upstream of the connected part to the EGR passage in the intake passage. A control device controls the internal combustion engine, in which device an opening degree of the intake throttle valve is determined on the basis of an intake air quantity.

13 Claims, 5 Drawing Sheets

(52) U.S. Cl.
CPC ......... *F02D 41/0077* (2013.01); *F02D 41/18* (2013.01); *F02D 2041/0017* (2013.01); *Y02T 10/47* (2013.01)

(58) Field of Classification Search
USPC ................................................. 123/568.11
See application file for complete search history.

(56) References Cited

U.S. PATENT DOCUMENTS

| | | | | |
|---|---|---|---|---|
| 2010/0050999 | A1* | 3/2010 | Murata | ............... F02D 41/0052 123/568.11 |
| 2010/0126142 | A1* | 5/2010 | Murata | .................... B60K 6/48 60/278 |
| 2010/0179745 | A1* | 7/2010 | Nakayama | .......... F02D 41/0072 701/108 |
| 2010/0211294 | A1* | 8/2010 | Soejima | ................ F02D 11/105 701/108 |
| 2012/0037134 | A1* | 2/2012 | Jankovic | ............. F02D 41/0002 123/568.21 |
| 2012/0095664 | A1* | 4/2012 | Nakamura | .......... F02D 41/0052 701/102 |
| 2014/0202436 | A1* | 7/2014 | Inagaki | ............... F02D 41/0065 123/568.21 |
| 2015/0211447 | A1 | 7/2015 | Takaki | |
| 2018/0252167 | A1 | 9/2018 | Suzuki et al. | |

FOREIGN PATENT DOCUMENTS

| | | | | |
|---|---|---|---|---|
| JP | 2008175139 | A * | 7/2008 | ......... F02D 41/0052 |
| JP | 2008-248729 | A | 10/2008 | |
| JP | 2012-47093 | A | 3/2012 | |
| JP | 2014-125980 | A | 7/2014 | |
| JP | 2015-124685 | A | 7/2015 | |
| WO | WO 2014/020982 | A1 | 2/2014 | |

* cited by examiner

CONTROL DEVICE FOR INTERNAL COMBUSTION ENGINE AND CONTROL METHOD FOR INTERNAL COMBUSTION ENGINE

TECHNICAL FIELD

The present invention relates to a control device for internal combustion engine and a control method for internal combustion engine.

BACKGROUND ART

It is disclosed in JP2012-47093A to provide an intake throttle valve on an upstream side of a connection point to an EGR passage in an intake passage and provide a pressure sensor for detecting a pressure near the connection point of the EGR passage. A feedback control for manipulating an intake throttle valve opening degree is executed so that the pressure detected via the pressure sensor reaches a predetermined target value slightly lower than an atmospheric pressure. In this way, EGR gas is introduced into the intake passage from the EGR passage.

SUMMARY OF INVENTION

In the above technique, since the intake throttle valve opening degree is manipulated according to the pressure detected by the pressure sensor, the pressure sensor having high accuracy needs to be used and cost is accordingly increased. If a pressure sensor having low accuracy is used, the controllability of the intake throttle valve opening degree is reduced due to a correspondingly low resolution. If it is tried to reliably introduce the EGR gas under such situation, a control has to be executed with a differential pressure between an exhaust passage and the intake passage set to be larger than required. In such case, an intake throttle quantity by the intake throttle valve also increases, wherefore pumping loss also increases. The occurrence of the pumping loss has a problem of causing an output reduction of an internal combustion engine.

The present invention aims to properly introduce EGR gas while suppressing an output reduction.

In one aspect of the present invention, an internal combustion engine includes an intake passage of the internal combustion engine, an exhaust passage of the internal combustion engine, an EGR passage connecting the intake passage and the exhaust passage. The internal combustion engine further includes a throttle valve provided downstream of a connected part to the EGR passage in the intake passage, and configured to control a quantity of intake air flowing into the internal combustion engine, and an intake throttle valve provided upstream of the connected part to the EGR passage in the intake passage. Here, a control device controls the internal combustion engine, in which device an opening degree of the intake throttle valve is determined on the basis of an intake air quantity.

DESCRIPTION OF EMBODIMENTS

Hereinafter, an embodiment of the present invention is described with reference to the drawings or the like.

Figure 1:
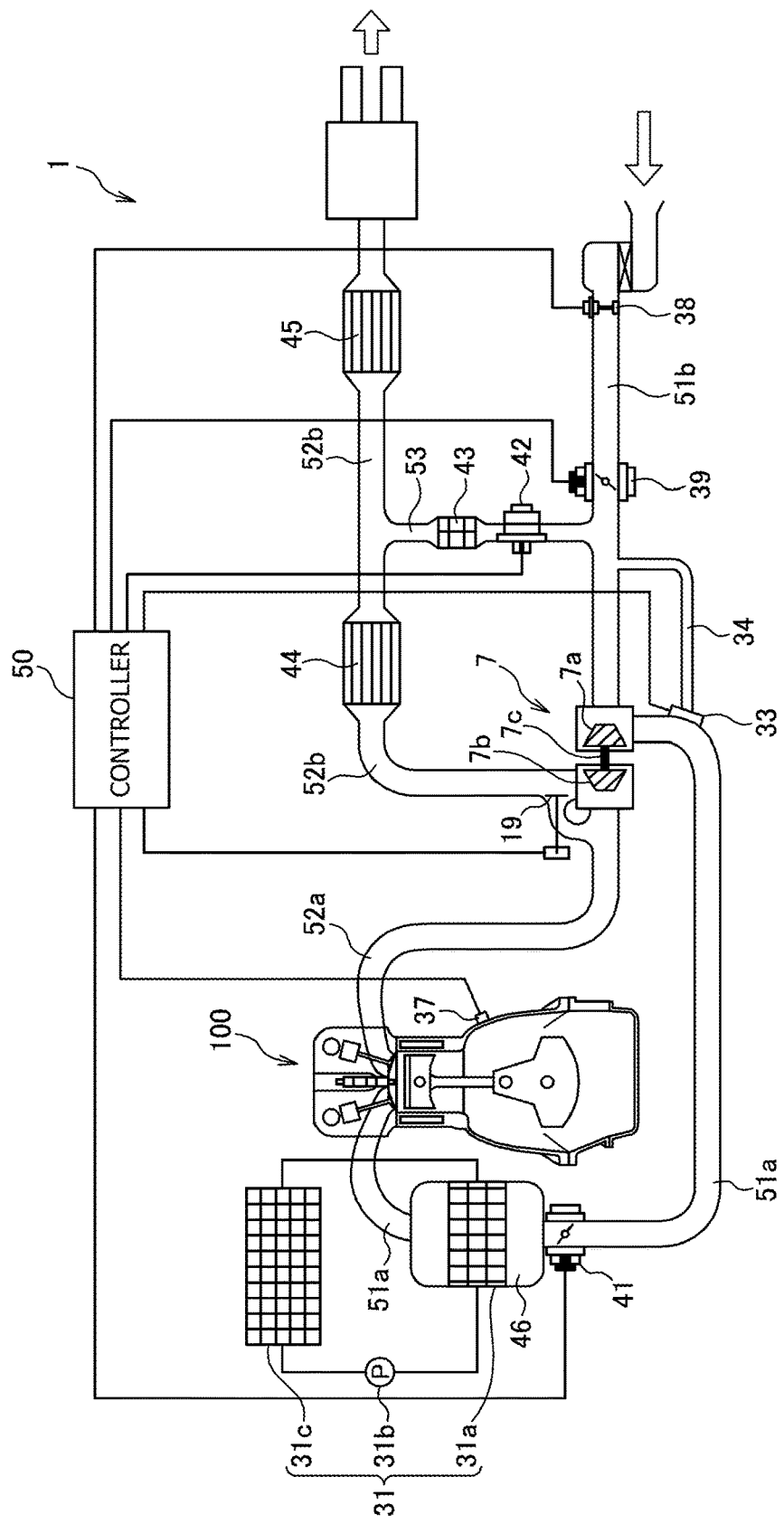
FIG. 1 is a diagram showing an entire configuration of an internal combustion system.

FIG. 1 is a diagram showing an entire configuration of an internal combustion system. An internal combustion engine 100 includes a turbo supercharger 7. The turbo supercharger 7 includes a compressor 7a and a turbine 7b connected by a shaft 7c. The compressor 7a is disposed on an intake passage 51a of the internal combustion engine 100. The turbine 7b is disposed on an exhaust passage 52a of the internal combustion engine 100. In this way, if the turbine 7b is rotated by exhaust energy of the internal combustion engine 100, the compressor 7a also rotates to supply intake air under pressure to a downstream side.

Further, the internal combustion engine 100 includes a crank angle sensor 37. The crank angle sensor 37 detects a crank angle in the internal combustion engine 100. The crank angle sensor 37 is connected to a controller 50 and the controller 50 can obtain the crank angle of the internal combustion engine 100. In this way, the controller 50 can obtain, for example, a revolution speed of the internal combustion engine 100.

Further, an electronically controlled throttle 41 is provided downstream of the compressor 7a in the intake passage 51a of the internal combustion engine 100 and a throttle opening degree is controlled by the controller 50. Further, a collector tank 46 is provided downstream of the electronically controlled throttle 41. An air cooler 31a is provided in the collector tank 46. A pump 31b for circulating cooling water and a sub-radiator 31c are connected to the air cooler 31a, and these constitute a water-cooled intercooler.

A recirculation passage 34 is branched from an intake passage 51b and connected to the intake passage 51a. The recirculation passage 34 bypasses the compressor 7a. A recirculation valve 33 is provided in the recirculation passage 34 and controlled to be opened and closed by the controller 50. By controlling the opening and closing of the recirculation valve 33, a boost pressure downstream of the compressor 7a is adjusted not to excessively increase.

Further, an air flow meter 38 is provided upstream of the compressor 7a in the intake passage 51b. The air flow meter 38 is connected to the controller 50. The controller 50 obtains the quantity of intake air passing in the intake passage 51b.

The exhaust passage 52a is provided with a bypass passage bypassing the turbine 7b. A wastegate valve 19 for controlling the opening and closing of this bypass passage is provided. The wastegate valve 19 is controlled to be opened and closed by the controller 50.

Exhaust catalysts 44, 45 for exhaust purification are provided in an exhaust passage 52b. Three-way catalysts or the like are used as the exhaust catalysts 44, 45.

The intake passage 51b and the exhaust passage 52b are connected via an EGR passage 53. An EGR cooler 43 is provided in the EGR passage 53. Further, an EGR valve 42 is provided in the EGR passage 53. The EGR valve 42 is connected to the controller 50. An opening degree of the EGR valve 42 is controlled by the controller 50 according to an operating condition of the internal combustion engine 100.

An admission valve (corresponding to an intake throttle valve in this embodiment, and expressed by "ADM/V" in the drawings or the like in some cases) 39 is provided between a connected part to the EGR passage 53 and the air flow meter 38 in the intake passage 51b. The admission valve 39 is controlled to be opened and closed by the controller 50 and produces a differential pressure between the intake passage 51b and the exhaust passage 52b. By this differential pressure, EGR gas is more easily introduced into the intake passage 51b from the exhaust passage 52b. It should be noted that the admission valve 39 is fully open in a default state thereof and operated in a closing direction by being controlled by the controller 50.

It should be noted that the admission valve 39 is dedicated to a control of forming a negative pressure in the intake passage 51b as against the exhaust passage 52b. On the other hand, the EGR valve 42 is dedicated to a control of introducing the EGR gas. The EGR valve 42 is controlled in accordance with a map indicating the opening degree of the EGR valve 42 in relation to a revolution speed and a load of the internal combustion engine 100.

The controller 50 reads outputs from various sensors described above and unillustrated other sensors and controls an ignition timing, an air-fuel ratio or the like on the basis of these. Further, the controller 10 executes an admission valve control to be described later.

Figure 2:
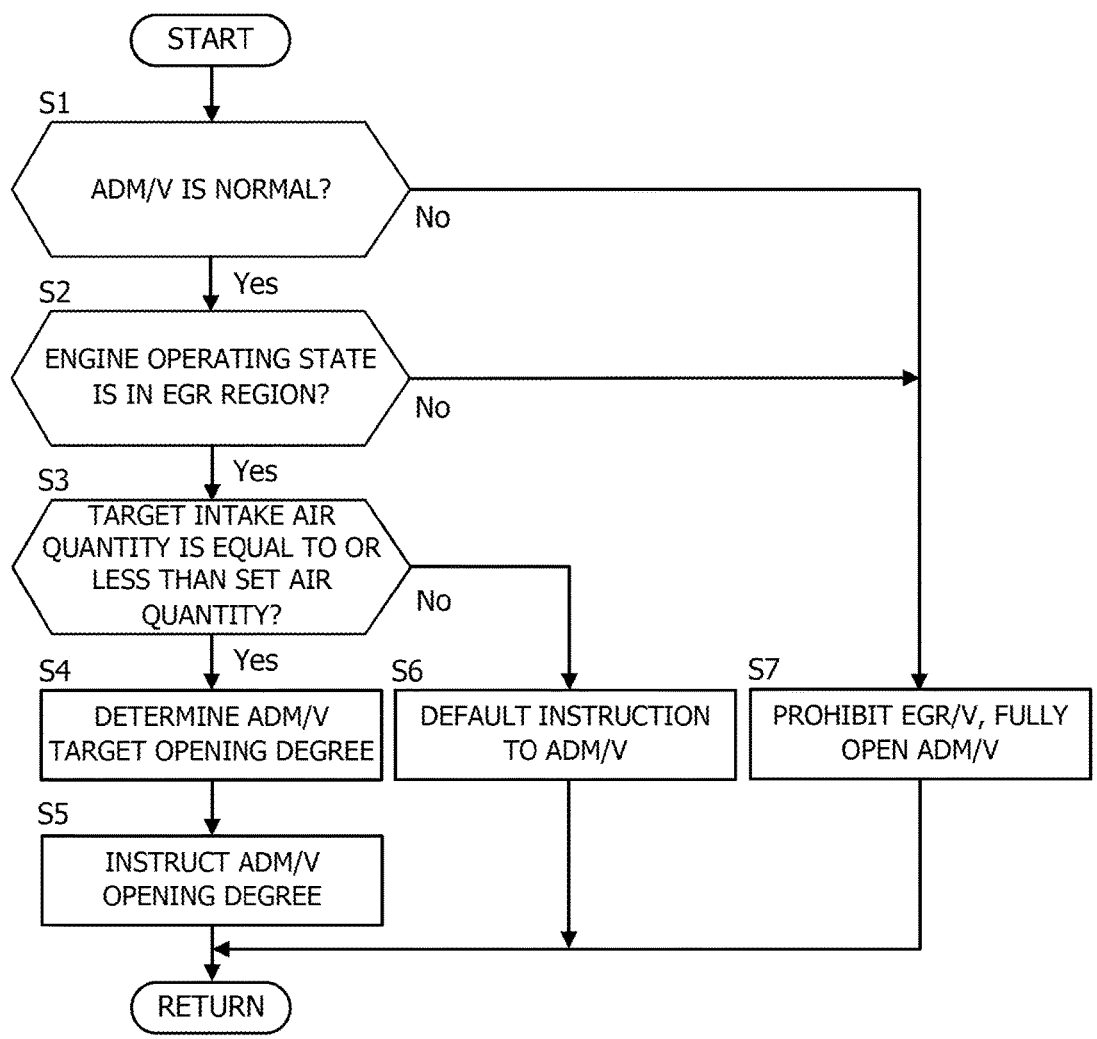
FIG. 2 is a flow chart of an admission valve control.

FIG. 2 is a flow chart of the admission valve control. This control routine is performed by the controller 50. This routine is repeatedly performed, for example, at a short interval of about 10 msec.

The controller 50 determines whether or not the admission valve 39 is in a normal state (S1). Examples of a case where the admission valve 39 is not in the normal state include a case where a butterfly valve as the admission valve 39 is fixed at a specific position.

If the admission valve 39 is not in the normal state, the controller 50 does not permit the operation of the EGR valve 42 in Step S7. Further, the controller 50 fully opens the admission valve 39 in Step S7. Not to permit the operation of the EGR valve 42, it is, for example, possible to adopt a technique for setting a value for prohibiting the operation in a flag for prohibiting the operation of the EGR valve 42.

On the other hand, if the admission valve 39 is in the normal state in Step S1, the controller 50 determines whether or not the current operating state is in an EGR region (S2).

Figure 3:
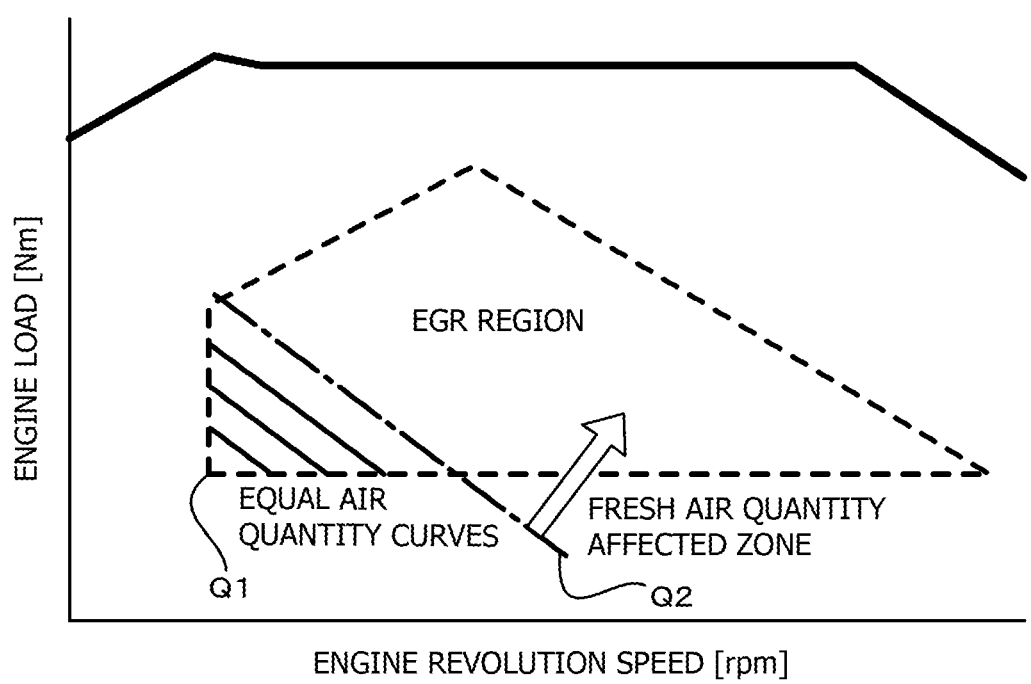
FIG. 3 is a graph showing equal air quantity curves of a target intake air quantity.

FIG. 3 is a graph showing equal air quantity curves of a target intake air quantity. In the graph of FIG. 3, a horizontal axis represents an internal combustion engine revolution speed and a vertical axis represents an internal combustion engine load. An output characteristic of the internal combustion engine 100 is shown by a solid line and the EGR region is enclosed by a broken line in FIG. 3. The EGR region is a region where the EGR valve 42 is operated to enable the EGR gas to be introduced into the intake passage 51b from the exhaust passage 52b.

Further, the equal air quantity curves of the target intake air quantity are shown in a part of the EGR region. Further, a boundary line to a fresh air quantity affected zone is shown by a dashed-dotted line. A region obliquely to the right of and above the dashed-dotted line, out of the EGR region, is the fresh air quantity affected zone. A region where the equal air quantity curves of the target intake air quantity are shown in FIG. 3 is a region where a suitable negative pressure can be generated in the intake passage 51b as against the exhaust passage 52b by controlling the admission valve 39 to a closing side. On the other hand, the fresh air quantity affected zone is a region where pumping loss by the admission valve 39 is large to notably affect a reduction of a fresh air introducing quantity if the admission valve 39 is controlled to the closing side.

The controller 50 obtains the revolution speed of the internal combustion engine 100 and the load of the internal combustion engine 100 and determines from these whether or not the current operating state is in the EGR region shown in FIG. 3. Whether or not the current operating state is in the EGR region is determined in this way because the admission valve 39 is controlled to the closing side only in a partial region of the EGR region. Here, the controller 50 obtains the revolution speed of the internal combustion engine 100 on the basis of a signal from the crank angle sensor 37. Further, the controller 50 obtains the load of the internal combustion engine 100 on the basis of a depression amount of an unillustrated accelerator pedal.

If the current operating state is determined not to be in the EGR region in Step S2, the controller 50 performs Step S7. Since the operation of Step S7 is already described, the description thereof is omitted.

On the other hand, if the current operating state is determined to be in the EGR region in Step S2, the controller 50 determines whether or not the target intake air quantity is equal to or less than a set air quantity (S3). The target intake air quantity is calculated according to the revolution speed of the internal combustion engine 100 and the load of the internal combustion engine 100. The load of the internal combustion engine 100 may be estimated according to a throttle opening degree. Here, the set air quantity is an air quantity indicated by the dashed-dotted line, which is a boundary line to the fresh air quantity affected zone shown in FIG. 3. Specifically, the set air quantity is an intake air quantity at which the influence of the pumping loss becomes large and the fresh air introducing quantity is affected when the intake air is throttled by the admission valve 39 if the target intake air quantity is increased beyond the set air quantity (i.e. a maximum value of the intake air quantity at which the fresh air introducing quantity is not affected even if the intake air is throttled). Particularly, in the case of using the turbo supercharger 7, it is desirable to suck more air. Thus, in the present embodiment, the set air quantity is set which is unlikely to affect the fresh air introducing quantity even if the turbo supercharger 7 is used.

Among the equal air quantity curves of the target intake air quantity of FIG. 3, the equal air quantity curve closer to a right-upper side represents a larger air quantity. While the target intake air quantity is small, an opening degree of the electronically controlled throttle 41 is not large and the intake air quantity itself is not large. Since the intake air quantity itself is not large as just described, even if the admission valve 39 is controlled to the closing side, it does not cause much resistance to the intake air. Thus, while the target intake air quantity is small, the admission valve 39 is allowed to be set to the closing side.

However, if the target intake air quantity increases and the opening degree of the electronically controlled throttle 41 also becomes large, large pumping loss is created due to an increase in the intake air quantity if the admission valve 39 is set to the closing side. On the other hand, if the admission valve 39 is kept fully open for the increase in the intake air quantity, the revolution speed of the internal combustion chamber 100 also increases and the rotation speed of the turbo supercharger 7 also increases. As a result, an exhaust pressure can be increased and, even if the admission valve 39 is fully opened, the EGR gas can be introduced into the intake passage 51b from the exhaust passage 52b in the EGR region. Therefore, if the target intake air quantity exceeds the set air quantity, it is better to fully open the admission valve 39.

Thus, the controller 50 determines whether or not the target intake air quantity is equal to or less than the set air quantity. Then, according to the determination result, the admission valve 39 is fully opened (Step S6 to be described later) and the opening degree of the admission valve 39 is determined according to the target intake air quantity (Step S4 to be described later).

If the target intake air quantity is not equal to or less than the set air quantity in Step S3, the controller 50 gives a default instruction to the admission valve 39 (S6). In the default instruction, the controller 50 turns off the supply of power to the admission valve 39 and fully opens the admission valve 39. Further, the controller 50 instructs the EGR valve 42 to permit the operation. A technique for setting a value for not prohibiting the operation of the EGR valve 42 in the flag for prohibiting the operation of the EGR valve 42 is, for example, known as a technique for instructing the EGR valve 42 to permit the operation. In this case, the introduction of the EGR gas is controlled only by controlling the EGR valve 42 in the situation that the admission valve 39 is fully opened.

On the other hand, if the target intake air quantity is equal to or less than the set air quantity in Step S3, the controller 50 determines a target opening degree of the admission valve 39 (S4).

Figure 4:
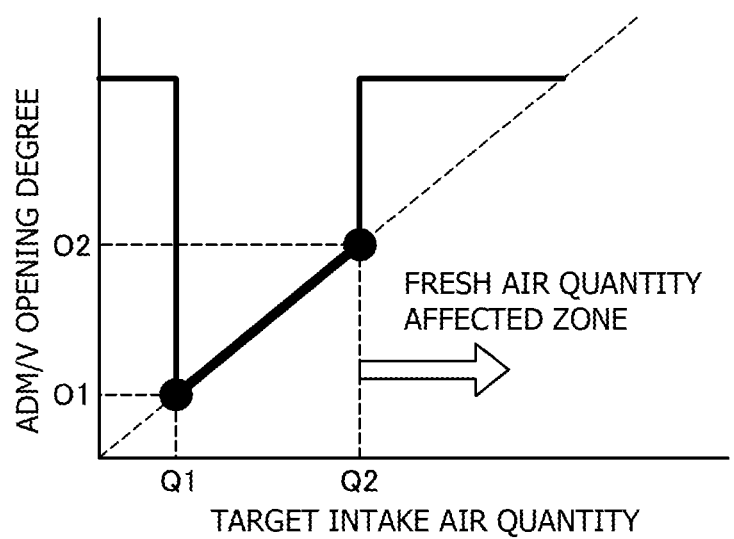
FIG. 4 is a graph showing a relationship between the target intake air quantity and an admission valve opening degree.

FIG. 4 is a graph showing a relationship between the target intake air quantity and the admission valve opening degree. In the graph of FIG. 4, a horizontal axis represents the target intake air quantity and a vertical axis represents the target opening degree of the admission valve 39. The target opening degree of the admission valve 39 is shown by a solid line in FIG. 4.

In the present embodiment, the target opening degree of the admission valve 39 is set to a full-open degree if the target intake air quantity is equal to or more than zero and less than Q1 as shown in FIG. 4. Further, when the target intake air quantity is Q1, the target opening degree of the admission valve 39 is set to O1. Further, the target opening degree of the admission valve 39 monotonously increases to O2 until the target intake air quantity reaches Q2. If the target intake air quantity exceeds Q2, the target opening degree of the admission valve 39 is set to the full-open degree again.

Q1 denotes a minimum target intake air quantity in the EGR region. O1 denotes the opening degree of the admission valve 39 at which a differential pressure for realizing a target EGR rate at the target intake air quantity Q1 is obtained. Further, Q2 denotes a maximum quantity of the target intake air quantity at which the deterioration of fuel economy caused by the pumping loss and an output reduction caused by suppressing the fresh air quantity due to the operation of the admission valve in the closing direction are small and allowable. O2 denotes the opening degree of the admission valve 39 at which a differential pressure for realizing a target EGR rate at the target intake air quantity Q2 is obtained.

The target opening degree of the admission valve 39 is partially discontinuous as just described for the following reason. First, if the target intake air quantity is equal to or more than zero and less than Q1, the operating state of the internal combustion chamber 100 is not in the EGR region. As described above, the admission valve 39 is controlled to the closing side only in the partial region of the EGR region. Thus, the target opening degree of the admission valve 39 is set to a full-open degree when the operating state of the internal combustion chamber 100 is not in the EGR region. On the other hand, if the target intake air quantity is equal to or more than Q1 and equal to or less than Q2, the exhaust pressure increases as the target intake air quantity increases, and the differential pressure between the exhaust passage 52b and the intake passage 51b is more easily obtained even if the admission valve 39 is not used. Thus, the opening degree of the admission valve 39 monotonously increases.

The operating state is outside the EGR region if the target intake air quantity is less than Q1. The target intake air quantity Q1 corresponds to the equal air quantity curve having a smallest air quantity out of the equal air quantity curves shown in FIG. 3. Below Q1, the target opening degree of the admission valve 39 is desirably set to the full-open degree.

If the target intake air quantity is equal to or more than Q1 and equal to or less than Q2, the target opening degree of the admission valve 39 according to the target intake air quantity is set to produce a differential pressure for introducing the EGR gas into the intake passage 51b from the exhaust passage 52b.

If the target intake air quantity becomes more than Q2, the operating state is in the fresh air quantity affected zone described above with reference to FIG. 3. That is, the target intake air quantity Q2 corresponds to the equal air quantity curve of the dashed-dotted line indicating the fresh air quantity affected zone out of the equal air quantity curves shown in FIG. 3. Thus, in a region where the target intake air quantity is more than Q2, the target opening degree of the admission valve 39 is preferably set to the full-open degree to suppress the pumping loss.

From the above, the target opening degree of the admission valve 39 is discontinuous at a boundary where the target intake air quantity is Q1. Further, the target opening degree of the admission valve 39 is discontinuous at a boundary where the target intake air quantity is Q2.

The controller 50 obtains the target intake air quantity in determining the target opening degree of the admission valve 39. The target intake air quantity is obtained by obtaining a required load on the basis of the depression amount of the unillustrated accelerator pedal and searching the target intake air quantity corresponding to this required load in an unillustrated map.

Then, the target opening degree of the admission valve 39 is obtained from the map of FIG. 4 on the basis of the obtained target intake air quantity.

Subsequently, the controller 50 controls the admission valve 39 so as to achieve the obtained target opening degree (S5). By doing so, it is possible to control an opening/closing degree of the admission valve 39 according to the target intake air quantity and produce a differential pressure for introducing the EGR gas into the intake passage 51b from the exhaust passage 52b.

Figure 5:
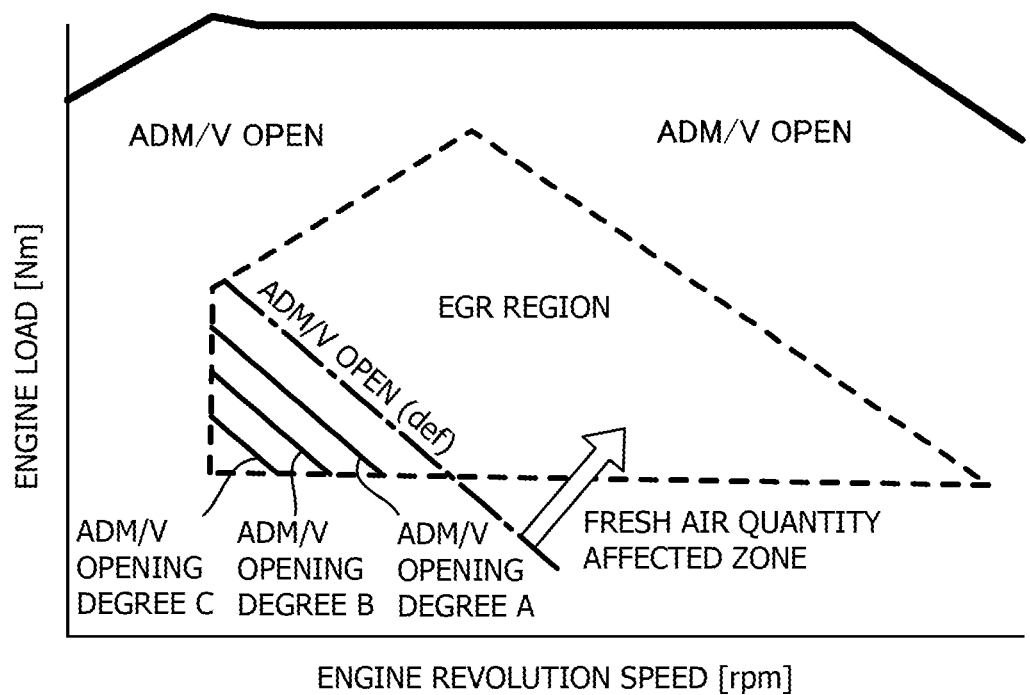
FIG. 5 is a graph showing the opening degree of the admission valve.

FIG. 5 is a graph showing the opening degree of the admission valve. In the graph of FIG. 5, a horizontal axis represents the internal combustion engine revolution speed and a vertical axis represents the internal combustion engine load. Also in FIG. 5, the output characteristic of the internal combustion engine 100 is shown by a solid line and the EGR region is shown by a broken line.

In FIG. 5, a region written as "ADM/V OPEN" is a region where the admission valve 39 is fully opened. A region where the admission valve 39 is controlled to the closing side is a region within the EGR region and to the left of and below a dashed-dotted line shown as ADM/V OPEN (def). Here, opening degrees A, B and C are shown as the opening degrees of the admission valve 39. The opening degree B is larger than the opening degree C. and the opening degree A is larger than the opening degree B.

If FIG. 5 is compared to FIG. 3 described above, the opening degrees of the admission valve 39 in FIG. 5 coincide with the equal air quantity curves of the target intake air quantity in FIG. 3. This means that the target opening degree of the admission valve 39 is determined by the target intake air quantity. For example, it means that, even if the revolution speed of the internal combustion engine 100 differs, the target opening degree of the admission valve 39 is set equally when the target intake air quantity is an equal intake air quantity.

Next, effects of the present embodiment are described.

In the present embodiment, the opening degree of the admission valve 39 is determined on the basis of the target intake air quantity. Here, it is assumed that a pressure sensor is provided in the intake passage 51b and measures a pressure and the admission valve 39 is controlled by feeding back a measurement result in order to generate a negative pressure in the intake passage 51b. If it is tried to control the admission valve 39 on the basis of the value of the pressure sensor under a situation where a small differential pressure has to be produced between the intake passage 51b and the exhaust passage 52b, the pressure sensor having extremely high accuracy is necessary. That is, a resolution of the pressure sensor has to be higher than the differential pressure produced by the control of the admission valve 39.

In the case of using a pressure sensor having low accuracy, the controllability of the admission valve 39 is reduced due to a low resolution thereof. If it is tried to reliably introduce the EGR gas under such situation, a control has to be executed with the differential pressure between the exhaust passage 52b and the intake passage 51b set to be larger than required. In such case, an intake throttle quantity by the admission valve 39 increases, wherefore the pumping loss also increases. The occurrence of the pumping loss causes an output reduction of the internal combustion engine.

In contrast, since the admission valve 39 can be controlled on the basis of the target intake air quantity according to the present embodiment, a control needs not be executed with the differential pressure between the exhaust passage 52b and the intake passage 51b set to be larger than required. Thus, the intake throttle quantity by the admission valve 39 can be set at a suitable quantity, wherefore the occurrence of the pumping loss can be suppressed to a minimum level. Then, the EGR gas can be properly introduced into the intake passage 51b while a reduction in the output of the internal combustion engine is suppressed.

Further, the controller 50 of the internal combustion engine 100 has the target intake air quantity corresponding to the required load as information in advance. Thus, if a map representing a relationship between the target intake air quantity and the admission valve 39 is available, the admission valve 39 can be easily controlled. Further, since the opening degree of the admission valve 39 can be directly controlled on the basis of the target intake air quantity, it is possible to ensure higher controllability than a control executed by feeding back the measurement result of the pressure sensor.

Further, in the present embodiment, the target intake air quantity is determined from the revolution speed of the internal combustion engine 100 and the load of the internal combustion engine 100. The target intake air quantity is represented by the equal air quantity curve as shown in FIG. 3. Since the equal air quantity curve can be obtained from the revolution speed of the internal combustion engine 100 and the load of the internal combustion engine 100, the target intake air quantity can be obtained from the revolution speed of the internal combustion engine 100 and the load of the internal combustion engine 100.

Further, in the present embodiment, even if the operating state differs, the opening degree of the admission valve 39 is also set at an equal opening degree when the target intake air quantity is an equal air quantity. For example, at the same target intake air quantity, the opening degree of the admission valve 39 is the same even if the revolution speed of the internal combustion engine 100 differs. This is because the opening degree of the admission valve 39 is determined along the equal air quantity curve as shown in FIGS. 3 and 5. Specifically, if the target intake air quantity is the same, the opening degree of the admission valve 39 can be the same.

Further, in the present embodiment, the admission valve 39 is fully opened if the target intake air quantity in the internal combustion engine 100 is more than the predetermined intake air quantity. Since the admission valve 39 is provided on the intake passage, if a volumetric flow rate increases, air resistance is generated and pumping loss may occur. Such pumping loss may cause the deterioration of fuel economy and an output reduction. However, in the present embodiment, as described above, the admission valve 39 is fully opened if the target intake air quantity in the internal combustion engine 100 is equal to or more than the predetermined intake air quantity. Thus, the pumping loss can be reduced and the deterioration of fuel economy and the output reduction can be suppressed.

Further, in the present embodiment, outside the EGR region, the admission valve 39 is fully opened as the EGR valve 42 is closed. In the present embodiment, the opening degree of the admission valve 39 is controlled in the EGR region where the EGR gas is introduced into the intake passage 51b. Thus, by fully opening the admission valve 39 outside the EGR region, it is possible to reduce drive loss by the admission valve 39 and improve fuel economy.

Further, in the present embodiment, the opening degree of the admission valve 39 is determined on the basis of the map (FIG. 4) representing the relationship between the target intake air quantity in the internal combustion engine 100 and the opening degree of the admission valve 39. By doing so, the controller 50 does not need to have an unnecessary control logic, wherefore a simple configuration can be adopted and controllability can also be improved.

It should be noted that, although the opening degree of the admission valve 39 is determined on the basis of the target intake air quantity here, this opening degree may be determined on the basis of an actual intake air quantity. In the case of determining the opening degree of the admission valve 39 on the basis of the actual intake air quantity, the opening degree of the admission valve 39 is determined on the basis of the intake air quantity obtained from the air flow meter 38. Further, in this case, the opening degree of the admission valve 39 is controlled on the basis of a map equivalent to that of FIG. 4.

Although the embodiments of the present invention have been described above, the above embodiments are merely an illustration of some application examples of the present invention and not intended to limit the technical scope of the present invention to the specific configurations of the above embodiments.

Although each of the above embodiments has been described as a separate embodiment, these may be combined as appropriate.

The invention claimed is:

1. A control device for an internal combustion engine, comprising:
   an intake passage of the internal combustion engine;
   an exhaust passage of the internal combustion engine;
   an EGR passage connecting the intake passage and the exhaust passage;
   a throttle valve provided downstream of a connected part to the EGR passage in the intake passage, and configured to control a quantity of intake air flowing into the internal combustion engine; and
   an intake throttle valve provided upstream of the connected part to the EGR passage in the intake passage,
   wherein the control device has a predetermined range of an intake air quantity in which range a fresh air introducing quantity is not affected by air throttling of the intake throttle valve, and is configured to determine an opening degree of the intake throttle valve on the basis of the intake air quantity when in an EGR region the intake air quantity is within the predetermined range.

2. The control device according to claim 1, wherein the opening degree of the intake throttle valve is determined to monotonously increase in accordance with an increase in the intake air quantity when the intake air quantity is within the predetermined range in the EGR region.

3. The control device according to claim 1, wherein the intake throttle valve is fully opened in the EGR region when the intake air quantity is beyond the predetermined range.

4. The control device according to claim 1, wherein a maximum intake air quantity in the predetermined range is such a quantity that, if the intake air quantity is increased beyond the maximum intake air quantity, the fresh air introducing quantity becomes to be affected due to an increase of a pumping loss when the intake air is throttled by the intake throttle valve.

5. The control device according to claim 1, wherein the intake air quantity is a target intake air quantity determined from a revolution speed of the internal combustion engine and a load of the internal combustion engine.

6. The control device according to claim 1, wherein the opening degree of the intake throttle valve is set at the same opening degree as a different operating state in which the intake air quantity is equal.

7. The control device according to claim 1, further comprising an EGR valve disposed on the EGR passage, wherein:
   an exhaust gas in the exhaust passage is introduced into the intake passage by controlling the EGR valve in the EGR region, and
   the intake throttle valve is fully opened outside the EGR region.

8. The control device according to claim 1, wherein the opening degree of the intake throttle valve is determined on the basis of a map representing a relationship between the intake air quantity in the internal combustion engine and the opening degree of the intake throttle valve.

9. A control method for an internal combustion engine including:
   an EGR passage connecting an intake passage and an exhaust passage; and
   an intake throttle valve provided upstream of a connected part to the EGR passage in the intake passage,
   the control method comprising:
   determining an intake air quantity of the internal combustion engine when an operating state is in an EGR region; and
   determining an opening degree of the intake throttle valve on the basis of the intake air quantity when in the EGR region the intake air quantity is within a predetermined range, wherein in the predetermined range of the intake air quantity, a fresh air introducing quantity is not affected by air throttling of the intake throttle valve.

10. The control method according to claim 9, wherein the opening degree of the intake throttle valve is determined to monotonously increase in accordance with an increase in the intake air quantity when the intake air quantity is within the predetermined range in the EGR region.

11. The control method according to claim 9, further comprising:
   fully opening the intake throttle valve in the EGR region when the intake air quantity is beyond the predetermined range.

12. The control method according to claim 9, wherein a maximum intake air quantity in the predetermined range is such a quantity that, if the intake air quantity is increased beyond the maximum intake air quantity, the fresh air introducing quantity becomes to be affected due to an increase of a pumping loss when the intake air is throttled by the intake throttle valve.

13. The control method according to claim 9, wherein the intake air quantity is a target intake air quantity determined from a revolution speed of the internal combustion engine and a load of the internal combustion engine.

* * * * *